(12) United States Patent
Morimoto

(10) Patent No.: US 6,741,318 B2
(45) Date of Patent: May 25, 2004

(54) LIQUID CRYSTAL DISPLAY MODULE

(75) Inventor: Hirokazu Morimoto, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/091,547

(22) Filed: Mar. 7, 2002

(65) Prior Publication Data
US 2002/0140894 A1 Oct. 3, 2002

(30) Foreign Application Priority Data

Mar. 28, 2001 (JP) ......................... 2001-094364
Feb. 14, 2002 (JP) ......................... 2002-037325

(51) Int. Cl.$^7$ ............................. G02F 1/1339
(52) U.S. Cl. ........................ 349/156; 349/155
(58) Field of Search ................. 349/155, 156

(56) References Cited

U.S. PATENT DOCUMENTS

| | | | | |
|---|---|---|---|---|
| 5,699,139 A | * | 12/1997 | Aastuen et al. | 349/156 |
| 6,157,433 A | * | 12/2000 | Kashimoto et al. | 349/187 |
| 6,181,390 B1 | * | 1/2001 | Wang et al. | 349/58 |
| 6,507,385 B1 | * | 1/2003 | Nishiyama et al. | 349/156 |
| 6,535,264 B1 | * | 3/2003 | Imabayashi et al. | 349/155 |

* cited by examiner

Primary Examiner—James Dudek
Assistant Examiner—Richard H Kim
(74) Attorney, Agent, or Firm—Pillsbury Winthrop LLP

(57) ABSTRACT

There is provided an LCD module including an LCD panel which includes a pair of substrates facing each other, columnar spacers formed on at least one of the substrates and configured to provide a clearance between the substrates, and a liquid crystal material filling the clearance between the substrates, and a support member supporting the panel and configured to make the panel stand during use of the module, wherein, where temperature of the panel rises from 25° C. to 50° C., the spacers keep elastically deformed by pressure applied from the substrates.

14 Claims, 3 Drawing Sheets

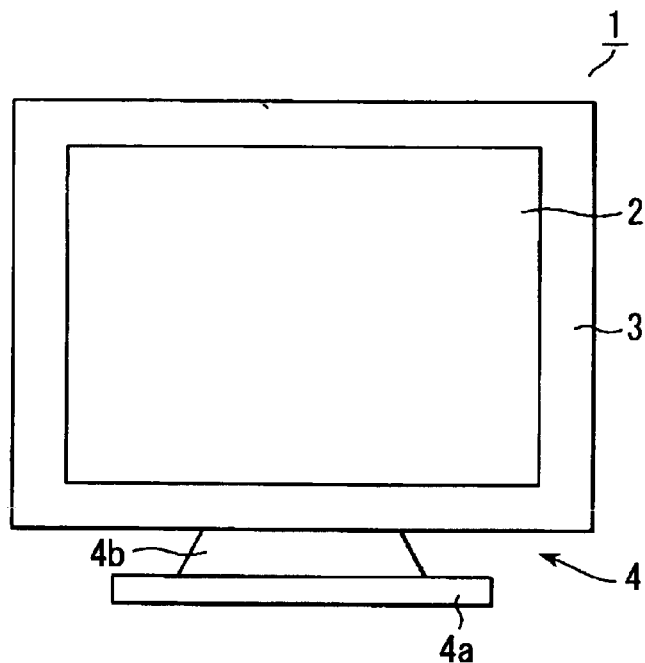
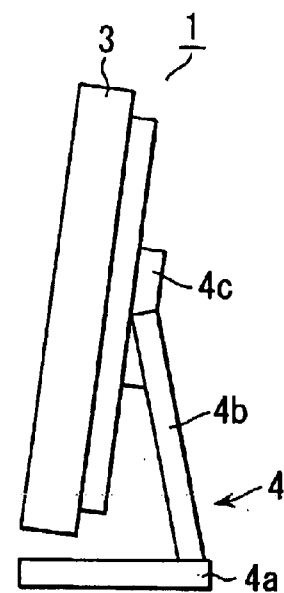
FIG. 1A
FIG. 1B
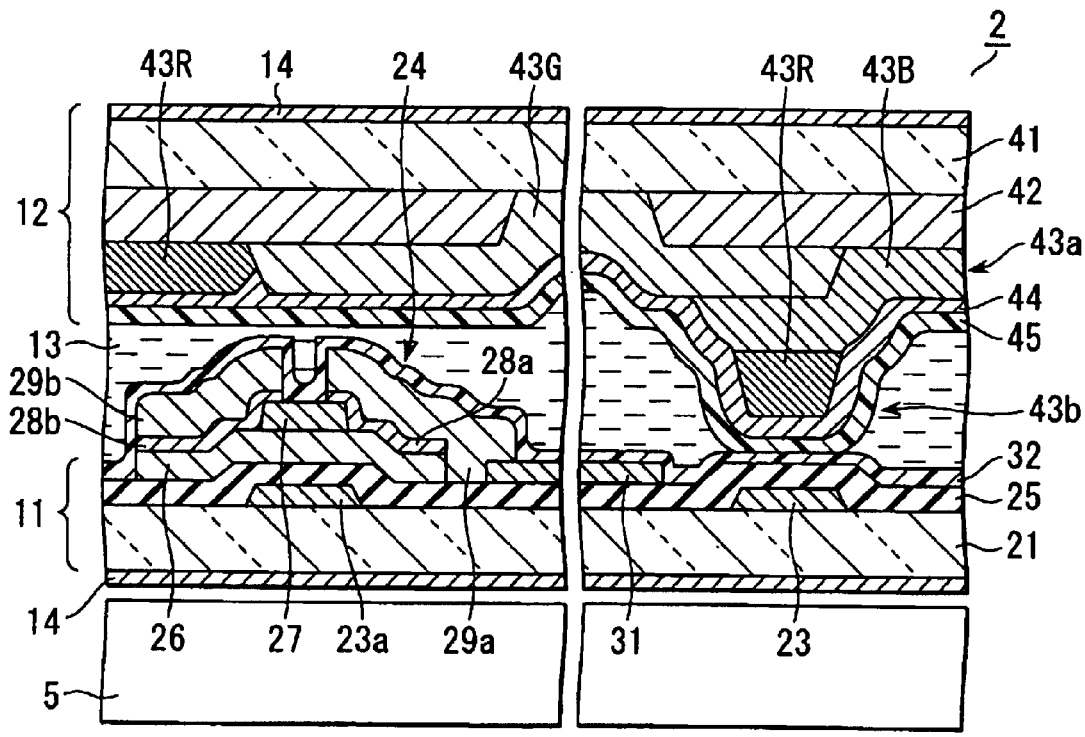
FIG. 2

LIQUID CRYSTAL DISPLAY MODULE

CROSS-REFERENCE TO RELATED APPLICATIONS

This application is based upon and claims the benefit of priority from the prior Japanese Patent Applications No. 2001-094364, filed Mar. 28, 2001; and No. 2002-037325, filed Feb. 14, 2002, the entire contents of both of which are incorporated herein by reference.

BACKGROUND OF THE INVENTION

1. Field of the Invention

The present invention relates to a liquid crystal display module, particularly, to a liquid crystal display module which has a large screen and whose liquid crystal display panel is made to stand during the use of the module.

2. Description of the Related Art

A liquid crystal display panel, hereinafter referred to as an "LCD panel", is excellent in that the panel is thin, lightweight and low in power consumption. Therefore, a liquid crystal display module, hereinafter referred to as an "LCD module", having the LCD panel incorporated therein is used in various technical fields.

To be more specific, the LCD module is used mainly for television receivers and computer monitors. In such use, a sufficient in-plane uniformity of the cell gap is realized in general by utilizing columnar spacers formed on a substrate by employing photolithographic technology in place of the granular spacers. Also, in such a use, an LCD module in which a backlight of high brightness is arranged on the back side of an LCD panel is utilized in many cases. As a matter of fact, a high brightness LCD module having a brightness equal to or higher than 300 cd/m$^2$ is utilized.

BRIEF SUMMARY OF THE INVENTION

According to a first aspect of the present invention, there is provided a liquid crystal display module, comprising a liquid crystal display panel which comprises a pair of substrates facing each other, columnar spacers formed on at least one of the substrates and configured to provide a clearance between the substrates, and a liquid crystal material filling the clearance between the substrates, and a support member supporting the panel and configured to make the panel stand during use of the module, wherein, where temperature of the panel rises from 25° C. to 50° C., the spacers keep elastically deformed by pressure applied from the substrates.

According to a second aspect of the present invention, there is provided a liquid crystal display module, comprising a liquid crystal display panel which comprises a pair of substrates facing each other, columnar spacers formed on at least one of the substrates and configured to provide a clearance between the substrates, and a liquid crystal material filling the clearance between the substrates, and a support member supporting the panel and configured to make the panel stand during use of the module, wherein the spacers are elastically deformed at 25° C. by pressure applied from the substrates, and $H_0$, $H_1$, $\beta$ and $\Delta D_1$ satisfy a relationship represented by an inequality:

$$H_0 - H_1 + 25 \times \beta H_0 > \Delta D_1,$$

where $H_0$ represents a height of the spacers at 25° C. under a state that the pressure is removed, $H_1$ represents a height of the spacers at 25° C. under a state that the pressure is applied, $\beta$ represents a linear expansion coefficient of the spacers, and $\Delta D_1$ represents an increase in distance between the substrates which is calculated from an increase in volume of the liquid crystal material caused by a temperature elevation from 25° C. to 50° C.

According to a third aspect of the present invention, there is provided a liquid crystal display module, comprising a liquid crystal display panel which comprises a pair of substrates facing each other, columnar spacers formed on at least one of the substrates and configured to provide a clearance between the substrates, and a liquid crystal material filling the clearance between the substrates, and a support member supporting the panel and configured to make the panel stand during use of the module, wherein the spacers are elastically deformed at 25° C. by pressure applied from the substrates, and $H_0$, $H_1$ and $\Delta D_1$ satisfy a relationship represented by an inequality:

$$H_0 - H_1 > \Delta D_1,$$

where $H_0$ represents a height of the spacers at 25° C. under a state that the pressure is removed, $H_1$ represents a height of the spacers at 25° C. under a state that the pressure is applied, and $\Delta D_1$ represents an increase in distance between the substrates which is calculated from an increase in volume of the liquid crystal material caused by a temperature elevation from 25° C. to 50° C.

The expression that the support member is configured to make the panel stand during use of the module includes the case where the support member is configured to make the panel stand all the time and the case where the support member is configured to make the panel lowered during nonuse of the module and to make the panel stand during use of the module. The expression that the panel stands implies that the angle made between the main surface of the panel and the direction of gravity falls within a range of 0° and 45°. Further, the linear expansion coefficient of the spacer implies the linear expansion coefficient of the columnar spacers in a direction perpendicular to the substrate surface. Still further, the height of the spacers implies the height based on the surface of that portion of the substrate on which the columnar spacers are formed and which is positioned in the region contributing to the display (pixel region).

The increase $\Delta D$ in distance between the substrates which is calculated from the increase in volume of the liquid crystal material, represents the value obtained under the assumption that the space (or clearance) filled with the liquid crystal material is expanded by the expansion of the liquid crystal material in only the direction perpendicular to the substrate surface (thickness direction), and that the increase $\Delta D$ is equal to the increase in length in the thickness direction of the space filled with the liquid crystal material. The height $H_0$ can be obtained by, for example, separating one substrate from the other substrate and by measuring the height of the columnar spacers at 25° C. Further, the height $H_1$ can be obtained by, for example, examining the cross-sectional structure of the liquid crystal display panel and is equal to the cell gap in the case where the columnar spacers are in contact with the both substrates.

In the first aspect, it is possible for the spacers to keep elastically deformed by the pressure applied from the substrates in the case where the temperature of the panel rises from 25° C. to 70° C.

In the second aspect, it is possible for $H_0$, $H_1$, $\beta$ and $\Delta D_2$ to satisfy a relationship represented by an inequality:

$$H_0 - H_1 + 45 \times \beta \times H_0 > \Delta D_2,$$

where $\Delta D_2$ represents an increase in distance between the substrates which is calculated from an increase in volume of the liquid crystal material caused by a temperature elevation from 25° C. to 70° C.

Further, in the third aspect, it is possible for $H_0$, $H_1$ and $\Delta D_2$ to satisfy a relationship represented by an inequality:

$$H_0 - H_1 > \Delta D_2,$$

where $\Delta D_2$ represents an increase in distance between the substrates which is calculated from an increase in volume of the liquid crystal material caused by a temperature elevation from 25° C. to 70° C.

It is possible for the module according to any of the first to third aspects to further comprise a light source configured to permit the panel to be irradiated with light. In this case, it is possible for the highest temperature reached by the panel by continuously lighting the light source to be equal to or lower than 50° C. or to be equal to or lower than 70° C.

According to any of the first to third aspects, it is possible for the diagonal dimension of the effective display region of the panel to be equal to or longer than 12 inches, to be equal to or longer than 17 inches, to be equal to or longer than 30 inches, or to be equal to or longer than 40 inches.

Further, according to any of the first to third aspects, it is possible for the volume expansion coefficient of the liquid crystal material to fall within a range of $0.65 \times 10^{-3°}$ $C.^{-1}$ to $0.85 \times 10^{-3°}$ $C.^{-1}$. Also, it is possible for the cell gap at 25° C. to be smaller than 4 μm.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

FIG. 1A is a front view schematically showing an LCD module according to an embodiment of the present invention;

FIG. 1B is a side view of the LCD module shown in FIG. 1A;

FIG. 2 is a cross-sectional view schematically showing the LCD panel included in the LCD module shown in FIGS. 1A and 1B;

DETAILED DESCRIPTION OF THE INVENTION

Figure 3:
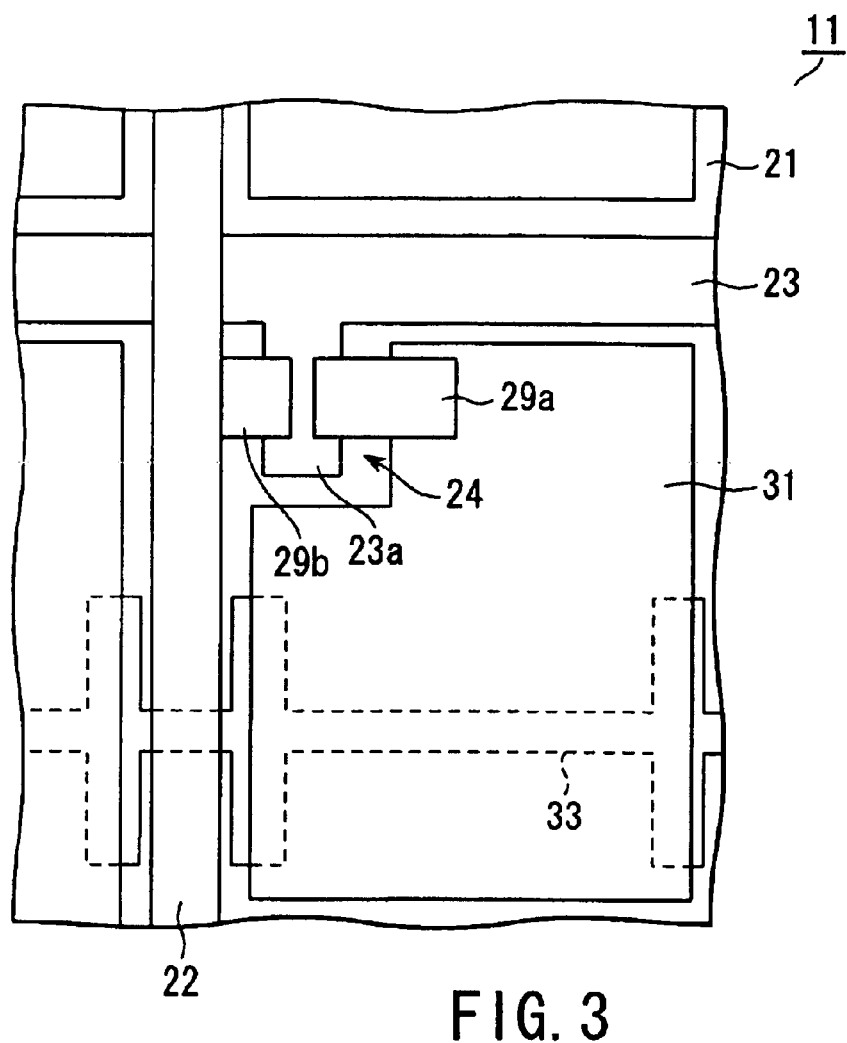
FIG. 3 is a plan view schematically showing the active matrix substrate of the LCD panel shown in FIG. 2.

An embodiment of the present invention will now be described in detail with reference to the accompanying drawings. In the accompanying drawings, the same or similar constituents are denoted by the same reference numerals so as to avoid an overlapping description.

FIG. 1A is a front view schematically showing the LCD module 1 according to an embodiment of the present invention, and FIG. 1B is a side view of the LCD module 1 shown in FIG. 1A.

The LCD module 1 shown in FIGS. 1A and 1B is composed mainly of an LCD panel 2, a backlight (not shown), a driving circuit (not shown), a case 3 housing these LCD panel 2, the backlight and the driving circuit, and a support member 4. The support member 4 is composed mainly of a base portion 4a, a column portion 4b, a swingable portion 4c, and a rotatable portion (not shown). The column portion 4b is fixed to the base portion 4a, and the swingable portion 4c is swingably mounted to the column portion 4b. Also, the rotatable portion is rotatably mounted to the swingable portion 4c and supports the case 3 and the members housed in the case 3.

The LCD module 1 shown in FIGS. 1A and 1B can be used as, for example, a television receiver or a computer monitor. In this case, it is possible for a tuner, a loudspeaker, etc. to be housed in the LCD module 1.

FIG. 2 is a cross-sectional view schematically showing the LCD panel 2 of the LCD module 1 shown in FIGS. 1A and 1B. The LCD panel 2 shown in FIG. 2 is, for example, a TN (twisted nematic) type LCD panel capable of a full-color display. The LCD panel 2 has, for example, an effective display region including (1024×3)×786 pixels arranged to form a matrix and having a diagonal dimension of 12 inches (about 30 cm).

The LCD panel 2 is composed of an active matrix substrate 11, a counter substrate 12 arranged to face the active matrix substrate 12, and a liquid crystal layer 13 made of a liquid crystal material and interposed between the active matrix substrate 11 and the counter substrate 12. An adhesive layer (not shown) is provided between the peripheries of the substrates 11 and 12 except the pouring port for pouring the liquid crystal material into the free space between the substrates 11 and 12. The pouring port noted above is sealed with a sealing material. Also, a polarizing plates 14 are attached to the both surfaces of the LCD panel 2, and a backlight 5 used as a planar light source apparatus is arranged behind the polarizing plate 14.

FIG. 3 is a plan view schematically showing the active matrix substrate 11 of the LCD panel 2 shown in FIG. 2. As shown in FIGS. 2 and 3, the active matrix substrate 11 included in the LCD panel 2 is composed of a transparent substrate 21 such as a glass plate having a thickness of, for example, 0.7 mm. Signal lines 22 and scanning lines 23 are formed on the transparent substrate 21 in a manner to intersect each other at right angles. In this embodiment, for example, 1024 signal lines 22 and 786 scanning lines 23 are arranged. It is possible for the signal lines 22 to be of a three-layer structure of, for example, molybdenum/aluminum/molybdenum and for the scanning lines 23 to be made of, for example, a molybdenum-tungsten alloy.

Switching elements such as thin film transistors (TFTs) 24 are arranged in the vicinity of the intersections between the signal lines 22 and the scanning lines 23. Each TFT 24 includes a gate electrode 23a extending from the scanning line 23. A gate insulating film 25 made of, for example, silicon nitride ($SiN_x$), a semiconductor layer 26 such as a hydrogenated amorphous silicon substrate layer (a-Si:H) used as a channel, and a channel protective layer 27 made of, for example, silicon nitride ($SiN_x$) are laminated successively on the gate electrode 23. Low-resistance semiconductor layers 28a and 28b such as low-resistance hydrogenated amorphous silicon semiconductor layers doped with phosphorus and covering the semiconductor layer 26 are formed on the sides of channel protective film 27, respectively. Further, a source electrode 29a and a drain electrode 29b extending from the signal line 22 are formed on the low resistance semiconductor layers 28a and 28b, respectively.

Pixel electrodes 31 made of a transparent conductive material such as ITO (indium tin oxide) are formed on an insulating film 25. Each pixel electrode 31 is electrically connected to the source electrode 29a of the TFT 24. Also, an alignment layer 32 made of, for example, polyimide is formed on the pixel electrode 31.

Auxiliary capacitance lines 33 are arranged between the substrate 21 and the insulating film 25. It is possible to form the auxiliary capacitance lines 33 in the process of forming the scanning lines 23. It should be noted that the auxiliary capacitance line 33, the pixel electrode 31 and the insulating film 25 interposed between the auxiliary capacitance line 33 and the pixel electrode 31 collectively form an auxiliary capacitor Cs.

The counter electrode 12 includes a transparent substrate 41 such as a glass plate having a thickness of, for example, 0.7 mm. Light shielding films 42 made of, for example, a resin are formed on the transparent substrate 41 in a manner to form a matrix. The light shielding films 42, which are called a black matrix, serve to prevent the light which passes through the clearance between the signal line 22 and the pixel electrode 31 and the clearance between the scanning line 23 and the pixel electrode 31 from leaking to the side of the observer and to prevent the TFT 24 from being irradiated with external light.

A red colored layer 43R, a blue colored layer 43B and a green colored layer 43G are formed on that surface of the substrate 41 on which the light shielding film 42 is formed. These colored layers 43R, 43B and 43G are partially overlapped with each other such that the portions which are not overlapped constitute a color filter layer 43a and the overlapped portions constitute columnar spacers 43b. Further, a counter electrode 44 made of a transparent conductive material such as ITO and an alignment layer 45 made of, for example, polyimide are successively laminated on the colored layers 43R, 43B and 43G.

In the LCD module using a backlight of a high brightness, the liquid crystal panel is heated by the heat generated from the backlight to temperatures close to 50° C. or to temperatures close to 70° C. in some cases. If such a temperature elevation takes place in the liquid crystal panel, the liquid crystal material is expanded so as to increase the cell gap.

As a result of an extensive research on the influences given by the expansion of the cell gap to the display function, the present inventor has found a significant phenomenon. Specifically, such an expansion of the cell gap does not give a significant influence to the display function in the LCD module used under the state that the LCD panel is positioned substantially horizontal like a monitor of a cash dispenser. However, when it comes to an LCD module used under the state that the LCD panel is made to stand during the use such as a television receiver or a computer monitor, such an expansion of the cell gap gives rise to a display unevenness, if the screen size is large. To be more specific, such a display unevenness can be recognized in the case where the diagonal dimension of the effective display region is about 12 inches, is rendered somewhat prominent in the case where the diagonal dimension noted above is about 15 inches, is rendered prominent in the case where the diagonal dimension noted above is about 17 inches, and is rendered highly prominent in the case where the diagonal dimension noted above is about 30 inches or about 40 inches. What should be noted is that the display unevenness derived from the expansion of the cell gap is a defective display inherent in a liquid crystal display module having a large screen and used under the state that the LCD panel is made to stand.

The present inventor has investigated the reason why the display unevenness caused by the expansion of the cell gap derived from the heat of the backlight occurs in the conventional LCD module, in the case where the screen size is large and the module is used under the state that the LCD panel is made stand. As a result, the present inventor has found the reasons for the occurrence of the particular display unevenness as follows.

As described above, the cell gap is increased if the temperature of the LCD panel is elevated. At room temperature, the columnar spacers are elastically deformed by the pressure applied from the substrates. Also, since the columnar spacers are expanded when heated, the columnar spacer is elongated if the cell gap is increased by the temperature elevation. In other words, the elongation of the columnar spacer follows the increase of the cell gap. If the LCD panel is allowed to stand, the liquid crystal material tends to move downward. However, the downward movement of the liquid crystal material is suppressed as far as the columnar spacers formed on the surface of one substrate are kept in contact with the surface of the other substrate. In other words, although the cell gap is certainly increased, the deflection of the substrate based on the downward movement of the liquid crystal material is suppressed. It follows that it is possible to maintain the in-plane uniformity of the cell gap.

However, if the cell gap is further increased, the columnar spacers are rendered incapable of following the increase of the cell gap. To be more specific, the columnar spacers formed on the surface of one substrate are moved away from the other substrate. If such a separation takes place, the liquid crystal material is moved downward so as to markedly deflect the substrates. As a result, the cell gap in the lower portion is rendered larger than that in the upper portion so as to bring about the display unevenness.

In the present embodiment, however, the LCD panel 2 is configured to meet the relationship represented by inequality (1) given below.

$$H_0 - H_1 + 25 \times \beta \times H_0 > \Delta D_1 \quad (1)$$

In the inequality (1), $H_0$ represents the height of the columnar spacers 43b measured at 25° C. in respect of the counter substrate 12, i.e., measured at 25° C. by removing the active matrix substrate 11, etc. from the LCD panel 2. $H_1$ represents the height of the columnar spacers 43b measured at 25° C. in respect of the LCD panel 2. $\beta$ represents the linear expansion coefficient of the columnar spacers 43b. $\Delta D_1$ represents the increase in cell gap calculated from the increase in volume of the liquid crystal material caused by the temperature elevation of the LCD panel 2 from 25° C. to 50° C.

The difference $H_0 - H_1$ in inequality (1) given above corresponds to the length of elongation of the columnar spacers 43b in the case where the pressure applied to the elastically deformed columnar spacers 43b is removed with the temperature maintained at 25° C. Also, the product $25 \times \beta \times H_0$ in inequality (1) given above corresponds to the length of elongation of the columnar spacers 43b in the case where the temperature is elevated from 25° C. to 50° C. under the state that the pressure is not applied. It follows that, where the LCD panel 2 satisfies the relationship given by inequality (1) above, the columnar spacers 43b follow the increase of the cell gap even if the temperature of the LCD panel 2 is elevated from 25° C. to 50° C. Such being the situation, the in-plane uniformity of the cell gap can be maintained in the present embodiment, even if the LCD panel 2 is heated to high temperatures, with the result that it is possible to prevent the display unevenness.

In the present embodiment, it is desirable for the LCD panel 2 to satisfy the relationship represented by inequality (2) given below.

$$H_0 - H_1 + 45 \times \beta \times H_0 > \Delta D_2 \qquad (2)$$

In the inequality, $\Delta D_2$ represents the increase in cell gap calculated from the increase in volume of the liquid crystal material caused by the temperature elevation of the LCD panel 2 from 25° C. to 70° C. Also, the product $45 \times \beta \times H_0$ in inequality (2) given above corresponds to the length of elongation of the columnar spacers 43b in the case where the temperature is elevated from 25° C. to 70° C. under the state that the pressure is not applied. It follows that, where the LCD panel 2 satisfies the relationship given by inequality (2) above, the columnar spacers 43b follow the increase in the cell gap even if the temperature of the LCD panel 2 is elevated from 25° C. to 70° C. In this case, the occurrence of the display unevenness can be prevented, even if the LCD panel 2 is heated to higher temperatures.

In the present embodiment, it is possible for the LCD panel 2 to satisfy the relationship represented by inequality (3) given below. It is also possible for the LCD panel 2 to satisfy the relationship represented by inequality (4) given below.

$$H_0 - H_1 > \Delta D_1 \qquad (3)$$

$$H_0 - H_1 > \Delta D_2 \qquad (4)$$

Since the product $\beta \times H_0$ has a positive value, the LCD panel 2, which satisfies the relationship represented by inequality (1) given above, also satisfies the relationship represented by inequality (3) given above. Likewise, the LCD panel 2, which satisfies the relationship represented by inequality (2) given above, also satisfies the relationship represented by inequality (4) given above.

In each of inequalities (1) to (4) given above, it is desirable for the left term to be larger than the right term by at least 0.01 μm. In this case, the display unevenness can be fully prevented.

In the present embodiment, it is desirable for the diagonal dimension of the effective display region of the LCD panel 2 to be at least 12 inches, more desirably to be at least 15 inches, furthermore desirably to be at least 17 inches, and, most desirably to be at least 30 inches or 40 inches. Since the display unevenness which is inherent in the case where the LCD panel is allowed to stand during use tends to be increased with increase in the diagonal dimension of the effective display region, the construction described above is more useful.

As described above, in the present embodiment, three-layer structures of the colored layers 43R, 43B and 43G are formed as the columnar spacers. However, it is possible for the columnar spacers to be of another construction. For example, it is also possible to form two-layer structures constituted by the colored layer 43G and one of the colored layers 43R and 43B as the columnar spacers. It is also possible to form four-layer structures by adding another layer to the three-layer structures of the colored layers 43R, 43B and 43G. It is also possible to form three-layer structures by adding another layer to the two-layer structures constituted by the colored layer 43G and one of the colored layers 43R and 43B as the columnar spacers. In addition, it is possible to form columnar projections on a color filter layer without overlapping the colored layers 43R, 43G and 43B. In other words, it is possible to form the columnar spacers without utilizing the colored layers 43R, 43G and 43B. Incidentally, the colored layers 43R, 43G and 43B are formed in the order mentioned in this embodiment. However, the order of forming the colored layers 43R, 43G and 43B is not particularly limited in the present embodiment.

In the present embodiment, the columnar spacers are formed on the counter substrate 12. However, it is also possible to form the columnar spacers on the active matrix substrate 11. Alternatively, it is possible to form the columnar spacers on both the active matrix substrate 11 and the counter substrate 12. Further, in the present embodiment, the color filter layer is formed on the counter substrate 12. However, it is also possible to form the color filter layer on the active matrix substrate 11.

In the present embodiment, the positions of the columnar spacers 43b are not particularly limited, though it is desirable for the columnar spacers 43 to be positioned between the adjacent pixel electrodes 31 in order to obtain a high opening ratio. In this case, the columnar spacers 43 can be positioned on the signal lines 22 or the TFTs 24. However, from the point of view of electrical separation between the substrates 11 and 12, it is desirable for the columnar spacers 43b to be positioned on the scanning lines 23.

In the present embodiment, the TN mode is utilized as the display mode. However, it is also possible to utilize the birefringence mode other than the TN mode. Further, it is possible to utilize the display mode other than the birefringence mode such as the guest-host mode.

Further, in the present embodiment, the present invention is applied to the LCD module shown in FIGS. 1A and 1B. However, it is also possible to apply the present invention to the LCD module of another construction. For example, it is also possible to apply the present invention to the LCD module of the wall-hanging type or the LCD module of the type where the LCD module is fitted into the wall.

Some Examples of the present invention will now be described.

EXAMPLE 1

In the first step, prepared was a counter substrate 12 of the LCD panel 2 shown in FIG. 2. The LCD panel 2 fabricated was a TN type LCD panel of the SVGA specification that (800×3)×600 pixels were arranged within the effective display region. Each of the substrates 21 and 41 of the LCD panel 2 was formed of a glass substrate sized at 31 cm×23 cm. The pixel pitch was sized at 102.5 μm×307.5 μm, and the diagonal dimension of the effective display region was about 30 cm. A load of 1,960 N was applied between the substrates 11 and 12, and the cell gap at 25° C. was 5.00 μm. Further, a liquid crystal material prepared by Chisso K. K. and having a volume expansion coefficient of $0.7 \times 10^{-3}$ °$C.^{-1}$ was used for fabricating the LCD panel 2.

An acrylic material was used for forming the columnar spacers 43, and the height at 25° C. of the columnar spacers 43, which were not elastically deformed, was set at 5.1 μm. Four columnar spacers 43 were arranged for every nine pixels. Also, the area in the tip portion of the columnar spacer 43b, i.e., the area of the contact region between the columnar spacer 43b and the active matrix substrate 11, was set at 100 μm² (=10 μm×10 μm). In other words, the contact area between the columnar spacers 43b within 1 mm² of the display region and the active matrix substrate 11 was set at 1,410 μm², i.e., the contact area ratio was set at 1,410 μm²/mm².

Figure 4:
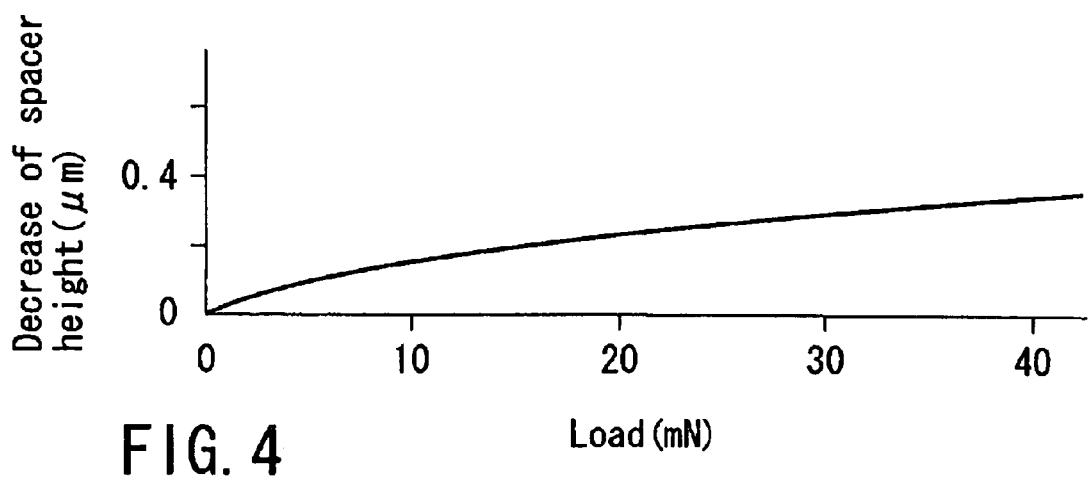
FIG. 4 is a graph showing the elastic deformation characteristics of the columnar spacers used in Example 1 of the present invention.

FIG. 4 is a graph showing the elastic deformation characteristics of the columnar spacers 43b. Plotted on the abscissa of the graph shown in FIG. 4 was the load applied to the single spacer 43b, with the reduction in height of the columnar spacer 43b relative to the state that the load was not applied to the columnar spacer 43b being plotted on the ordinate. As apparent from the graph of FIG. 4, the height of the columnar spacer 43b was decreased by about 0.1 μm by simply applying a load of only 10 mN. In other words, the elastic deformation of the columnar spacers 43b was relatively large. Incidentally, the curve shown in FIG. 4 can be represented by the equation given below:

$$y = 0.0187 \times x^{0.7212}$$

where x represents the load (mN) applied to the columnar spacer 43b, and y represents the reduction (μm) in the height of the columnar spacer 43b.

Then, the changes in the cell gap and the spacer height relative to the temperature elevation were examined in respect of the LCD panel 2.

Figure 5:
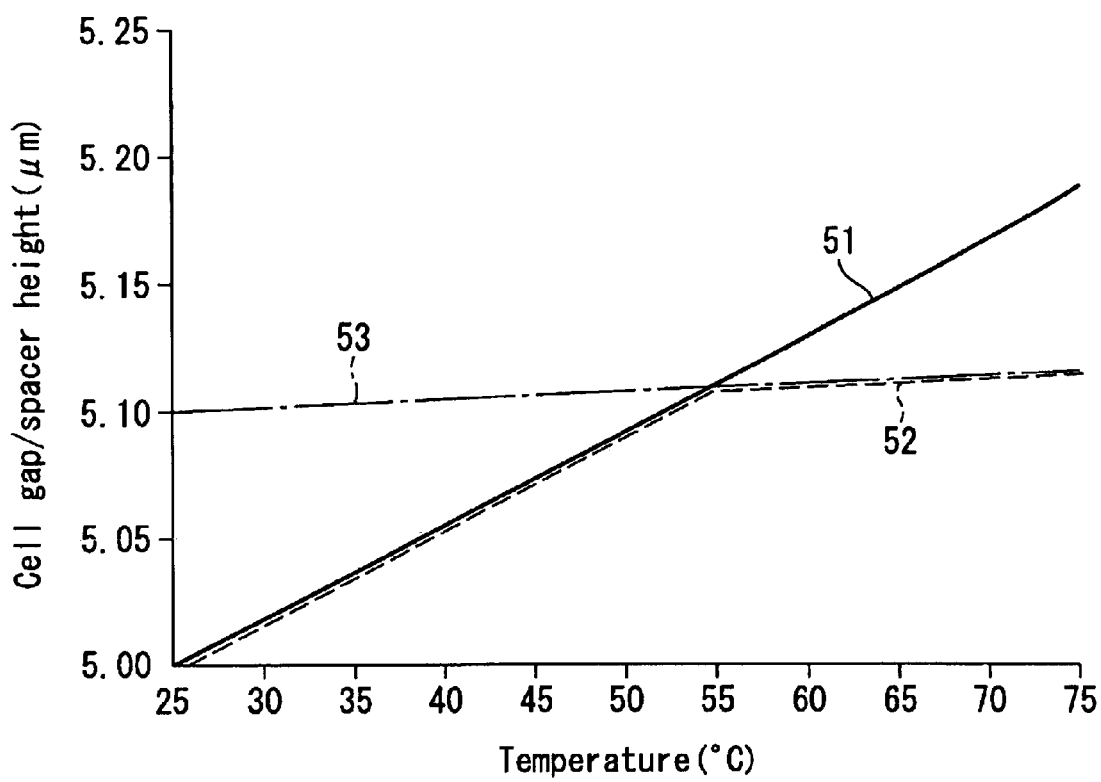
FIG. 5 is a graph showing the changes in the cell gap and the height of the spacers relative to the temperature of the LCD panel in Example 1 of the present invention.

FIG. 5 is a graph showing the changes in the cell gap and the spacer height relative to the temperature. Plotted on the abscissa of the graph shown in FIG. 5 is the temperature, with the cell gap and the spacer height being plotted on the ordinate. A solid line 51 shown in the graph represents the data on the cell gap, with a broken line 52 representing the data on the height of the columnar spacers 43b. Incidentally, a dot-and-dash line 53 in FIG. 5 represents the data on the height of the columnar spacers 43b to which the load was not applied. As shown in FIG. 5, the columnar spacers 43b are kept in contact with the active matrix substrate 11 under temperatures up to about 54° C. in the LCD panel 2.

The LCD module 1 shown in FIGS. 1A and 1B was fabricated by using the LCD panel 2. Incidentally, where the backlight 5 included in the LCD module 1 is continuously lit, the LCD panel 2 is heated to the highest temperature of 50° C.

The LCD module 1 was examined in terms of the display unevenness by changing the angle made between the main surface of the LCD panel 2 and the direction of gravity within a range of 0° to 45°. The display unevenness was not occurred in the LCD module 1. Also, the nonuniformity in the cell gap was found to be not larger than 0.05 μm under the particular conditions.

Comparative Example

An LCD panel 2 was fabricated substantially as in Example 1, except that a material having a smaller deformation under load was used for preparing the columnar spacers 43b. Incidentally, the height of the columnar spacers 43b included in the LCD panel 2 was about 5.05 μm at 25° C. under the state that the load was not applied to the columnar spacers 43b, and the cell gap at 25° C. was 5.00 μm. Also, the LCD panel 2 for this Comparative Example and the LCD panel 2 for Example 1 were substantially equal to each other in the linear expansion coefficient of the columnar spacers 43b.

The columnar spacers 43b included in the LCD panel 2 were kept in contact with the active matrix substrate 11 under temperatures up to about 42° C. However, when heated to higher temperatures, the columnar spacers 43b were moved away from the active matrix substrate 11.

The LCD module 1 shown in FIGS. 1A and 1B were fabricated by using the LCD panel 2 thus prepared.

Incidentally, where the backlight 5 included in the LCD module 1 was continuously lit, the LCD panel 2 was heated to the highest temperature of 50° C.

The LCD module 1 was examined in terms of the display unevenness under the conditions similar to those described previously in conjunction with Example 1. In this LCD module 1, the display unevenness was occurred in a lower portion of the LCD panel 2. Also, the nonuniformity of the cell gap under the particular state far exceeded 0.05 μm.

EXAMPLE 2

A LCD panel 2 was fabricated substantially as in Example 1, except that the height of the columnar spacers 43b at 25° C. was 3.60 μm under the state that the load was not applied to the columnar spacers 43b, and that the cell gap at 25° C. was 3.5 μm. The changes in the cell gap and the spacer height relative to the temperature elevation were examined in respect of the LCD panel 2.

Figure 6:
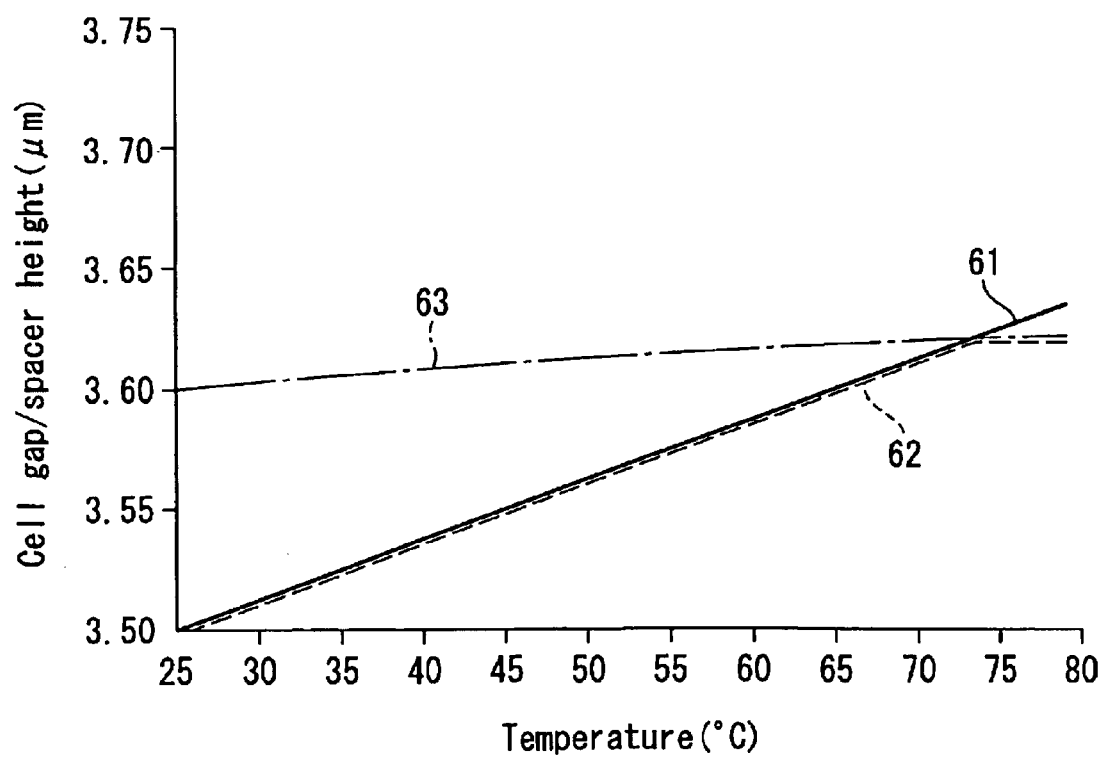
FIG. 6 is a graph showing the changes in the cell gap and the height of the spacers relative to the temperature of the LCD panel in Example 2 of the present invention.

FIG. 6 is a graph showing the changes in the cell gap and the spacer height relative to the temperature. Plotted on the abscissa of the graph shown in FIG. 6 is the temperature, with the cell gap and the spacer height being plotted on the ordinate. A solid line 61 shown in the graph represents the data on the cell gap, with a broken line 62 representing the data on the height of the columnar spacers 43b. Incidentally, a dot-and-dash line 63 in FIG. 5 represents the data on the height of the columnar spacers 43b to which the load was not applied. As shown in FIG. 6, the columnar spacers 43b were kept in contact with the active matrix substrate 11 under temperatures up to about 73° C. in the LCD panel 2.

The LCD module 1 shown in FIGS. 1A and 1B was fabricated by using the LCD panel 2. Incidentally, where the backlight 5 included in the LCD module 1 was continuously lit, the LCD panel 2 was heated to the highest temperature of 70° C.

The LCD module 1 was examined in terms of the display unevenness by changing the angle made between the main surface of the LCD panel 2 and the direction of gravity within a range of 0° to 45°. The display unevenness was not occurred in the LCD module 1. Also, the nonuniformity in the cell gap was found to be not larger than 0.05 μm under the particular state.

As described above, the LCD module is configured in the present invention such that, where the temperature of the LCD panel is elevated from 25° C. to a predetermined temperature, the columnar spacers are kept elastically deformed by the pressure applied from the substrates. Therefore, according to the present invention, the columnar spacers can be prevented from being moved away from one substrate, and therefore, in-plane uniformity of the cell gap can be prevented from being impaired even if the LCD panel is made stand during use and is heated to a high temperature.

In conclusion, the present invention provides a liquid crystal display module which has a large screen, whose liquid crystal display panel is made stand during the use of the module, and which is unlikely to give rise to the display unevenness even if heated to a high temperature.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display module, comprising:
a liquid crystal display panel which comprises a pair of substrates facing each other, columnar spacers formed on at least one of the substrates and configured to provide a clearance between the substrates, and a liquid crystal material filling the clearance between the substrates; and
a support member supporting the panel and configured to make the panel stand during use of the module,
wherein the spacers are elastically deformed at 25° C. by pressure applied from the substrates,
wherein $H_0$, $H_1$, $\beta$ and $\Delta D_1$ satisfy a relationship represented by an inequality:

$$H_0 - H_1 + 25 \times \beta \times H_0 > \Delta D_1 + 0.01 \, \mu m,$$

where $H_0$ represents a height of the spacers at 25° C. under a state that the pressure is removed, $H_1$ represents a height of the spacers at 25° C. under a state that the pressure is applied, $\beta$ represents a linear expansion coefficient of the spacers, and $\Delta D_1$ represents an increase in distance between the substrates which is calculated from an increase in volume of the liquid crystal material caused by a temperature elevation from 25° C. to 50° C.,
wherein volume expansion coefficient of the liquid crystal material falls within a range of $0.65 \times 10^{-3}$ ° $C.^{-1}$ to $0.85 \times 10^{-3}$ ° $C.^{-1}$, and
wherein the liquid crystal panel is free from granular spacers.

2. A liquid crystal display module according to claim 1, further comprising a light source configured to irradiate the panel with light, wherein a highest temperature reached by the panel by continuously lighting the light source is equal to or lower than 50° C.

3. A liquid crystal display module according to claim 2, wherein the panel includes an effective display region with a diagonal dimension equal to or longer than 12 inches.

4. A liquid crystal display module according to claim 1, wherein $H_0$, $H_1$, $\beta$ and $\Delta D_2$ satisfy a relationship represented by an inequality:

$$H_0 - H_1 + 45 \times \beta \times H_0 > \Delta D_2,$$

where $\Delta D_2$ represents an increase in distance between the substrates which is calculated from an increase in volume of the liquid crystal material caused by a temperature elevation from 25° C. to 70° C.

5. A liquid crystal display module according to claim 4, further comprising a light source configured to irradiate the panel with light, wherein a highest temperature reached by the panel by continuously lighting the light source is equal to or lower than 70° C.

6. A liquid crystal display module according to claim 5, wherein the panel includes an effective display region with a diagonal dimension equal to or longer than 12 inches.

7. A liquid crystal display module according to claim 1, wherein each of the columnar spacers includes a three-layered structure of a red colored layer, a blue colored layer and a green colored layer.

8. A liquid crystal display module, comprising:
a liquid crystal display panel which comprises a pair of substrates facing each other, columnar spacers formed on at least one of the substrates and configured to provide a clearance between the substrates, and a liquid crystal material filling the clearance between the substrates; and
a support member supporting the panel and configured to make the panel stand during use of the module,
wherein the spacers are elastically deformed at 25° C. by pressure applied from the substrates,
wherein $H_0$, $H_1$ and $\Delta D_1$ satisfy a relationship represented by an inequality:

$$H_0 - H_1 > \Delta D_1 + 0.01 \, \mu m,$$

where $H_0$ represents a height of the spacers at 25° C. under a state that the pressure is removed, $H_1$ represents a height of the spacers at 25° C. under a state that the pressure is applied, and $\Delta D_1$ represents an increase in distance between the substrates which is calculated from an increase in volume of the liquid crystal material caused by a temperature elevation from 25° C. to 50° C., wherein volume expansion coefficient of the liquid crystal material falls within a range of $0.65 \times 10^{-3}$ ° $C.^{-1}$ to $0.85 \times 10^{-3}$ ° $C.^{-1}$, and wherein the liquid crystal panel is free from granular spacers.

9. A liquid crystal display module according to claim 8, further comprising a light source configured to irradiate the panel with light, wherein a highest temperature reached by the panel by continuously lighting the light source is equal to or lower than 50° C.

10. A liquid crystal display module according to claim 9, wherein the panel includes an effective display region with a diagonal dimension equal to or longer than 12 inches.

11. A liquid crystal display module according to claim 8, wherein $H_0$, $H_1$ and $\Delta D_2$ satisfy a relationship represented by an inequality:

$$H_0 - H_1 > \Delta D_2,$$

where $\Delta D_2$ represents an increase in distance between the substrates which is calculated from an increase in volume of the liquid crystal material caused by a temperature elevation from 25° C. to 70° C.

12. A liquid crystal display module according to claim 11, further comprising a light source configured to irradiate the panel with light, wherein a highest temperature reached by the panel by continuously lighting the light source is equal to or lower than 70° C.

13. A liquid crystal display module according to claim 12, wherein the panel includes an effective display region with a diagonal dimension equal to or longer than 12 inches.

14. A liquid crystal display module according to claim 8, wherein each of the columnar spacers includes a three-layered structure of a red colored layer, a blue colored layer and a green colored layer.

* * * * *